Feb. 28, 1961

T. STANWICK ET AL 2,973,174

VEHICLE LOAD SHOCK ABSORBING UNIT

Filed Aug. 6, 1959

INVENTORS
TAD STANWICK
WALLACE HAMILTON
JOSEPH E. HANNIGAN

BY

ATTORNEY

INVENTORS
TAD STANWICK
WALLACE HAMILTON
BY  JOSEPH E. HANNIGAN

ATTORNEY

United States Patent Office 2,973,174
Patented Feb. 28, 1961

2,973,174

VEHICLE LOAD SHOCK ABSORBING UNIT

Tad Stanwick, Washington, D.C., and Wallace Hamilton, Chagrin Falls, and Joseph E. Hannigan, Hudson, Ohio, assignors to Cleveland Pneumatic Industries, Inc., Cleveland, Ohio, a corporation of Ohio Filed Aug. 6, 1959, Ser. No. 831,975

7 Claims. (Cl. 248—119)

This invention relates generally to shock absorbing devices and more particularly to a shock absorbing mechanism adapted to shock mount a load on a vehicle such as a railroad flat car or the like.

It is an important object of this invention to provide a vehicle load support incorporating shock absorbing means to limit the accelerations of the vehicle load when the vehicle is abruptly started or stopped.

It is another important object of this invention to provide a shock absorbing device for vehicle loads which permits limited movement of the load under accelerating or decelerating conditions and which automatically returns the load to its initial position.

It is still another object of this invention to provide a shock absorbing mechanism using a single shock absorber and spring combination which operates in both directions from a midposition.

It is another object of this invention to provide a vehicle in combination with a shock absorbing spring mechanism capable of cushioning acceleration in both directions of vehicle movement.

Further objects and advantages will appear from the following description and drawings, wherein.

Many cargoes that are carried by vehicles such as railroad cars are relatively fragile and are damaged if they are accelerated or decelerated rapidly. This is particularly troublesome in railroad operation during the handling of the cars within the freight yard where the coupling and humping operations often result in abrupt stopping or starting of the railroad car. If the load is securely lashed to the vehicle itself, it is subjected to excessive accelerating and decelerating forces unless means are provided for permitting limited relative movement between the load and the vehicle. Although the preferred form of this invention is shown in connection with a railroad flat car type vehicle, it is equally suitable for use in any other type of vehicle, such as trucks, trailers, ships, and the like.

Figure 1:
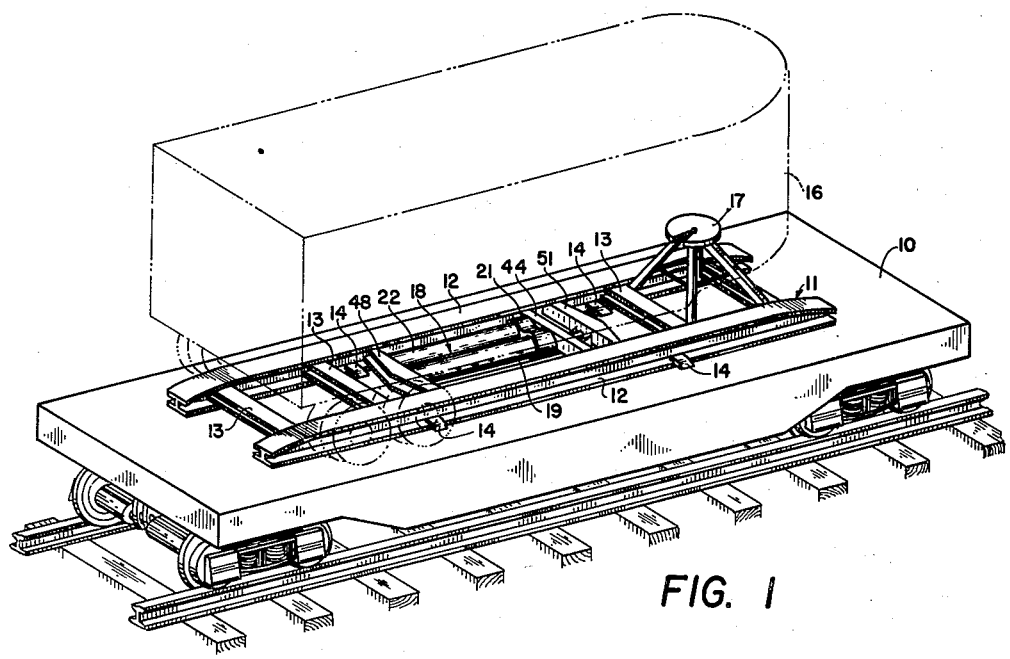
Figure 1 is a perspective view illustrating a preferred form of this invention mounted on a typical railroad flat car.

The shock absorbing mechanism, as shown in Figure 1, is mounted on a railroad flat car 10. A frame 11 formed of suitable I-beam side rails 12 and cross beams 13 is mounted on the flat car 10 for axial movement relative thereto. A simple mounting for this movement is provided by fixed cleats 14 mounted on the upper surface of the flat car 10 which engage the lower flanges of the side rails 12 thus providing for longitudinal movement of the frame 11 as well as preventing its lateral movement relative to the flat car 10. The cross beams are mounted high on the side rails 12 so that they clear the cleats 14. If a truck trailer 16, of the type shown in phantom in Figure 1, is the load on the vehicle 10, a fifth wheel mount 17 is mounted at one end of the frame. If other types of loads are carried, the fifth wheel mount 17 is folded out of the way or removed, and suitable lashing means for mounting the load on the frame 11 may be provided.

A spring and shock absorbing assembly 18 is connected between the flat car 10 and the frame 11 to resiliently maintain the frame in a neutral posiiton while permitting limited movement of the frame in either longitudinal direction therefrom. The spring and shock absorbing assembly 18 includes first and second cylinders 19 and 22 threaded at their open ends into an end member 21, and their closed ends formed with projections 47 which extend through a cross member 48. Nuts 49 threaded onto the projections 47 secure the cylinders to the cross member 48. A piston 23 is axially movable along and provides sealing engagement with the cylinder wall 24 of the first cylinder 19. A piston rod 26 is connected to the piston 23 and extends through a gland in the end member 21. The first cylinder 19, the end member 21, and the piston 23 therefore co-operate to define a variable volume chamber 27 the volume of which isis reduced by movement of the piston 23 to the right and the volume of which is increased by movement to the left. A floataing piston 28 slides along and is in sealing engagement with the cylinder wall 29 of the second cylinder 22. The second cylinder 22, is therefore, divided into a forward chamber 31 and a rearward chamber 32.

Figure 2:
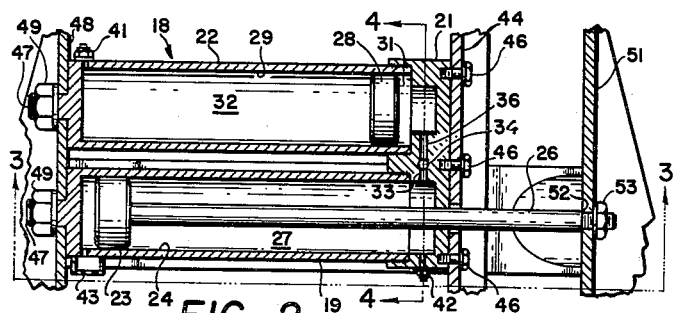
Figure 2 is an enlarged fragmentary section illustrating the structure of the spring and shock absorbing mechanism.

The variable volume chamber 27 and the forward chamber 31 are connected through a first passage 33, an adjustable orifice or flow restriction 34, and a second passage 36. These two chambers and the connecting passages are filled with hydraulic oil while the rearward chamber 32 is pressurized with air. The air in the rearward chamber 32 operates to urge the floating piston 28 to the right pressurizing the liquid in the forward chamber 31 and in the variable volume chamber 27. This results in a reaction force on the piston 23 which urges it to the left toward the position of Figure 2. When a tension force is applied to the piston rod 26 which moves the piston 23 to the right, oil is displaced from the variable volume chamber 27 through the two passages 33 and 36 and the adjustable orifice 34 into the forward chamber 31. This causes the floating piston 28 to move to the left, further compressing the air in the rearward chamber 32.

Figure 4:
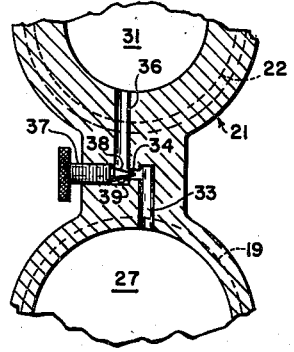
Figure 4 is an enlarged fragmentary view of the adjustable valve used to control the damping of the mechanism.

The structure of the variable orifice or flow restriction 34 is shown in Figure 4 and includes a valve element 37 threaded into the end member 21. The valve element 37 is formed with a conical valving portion 38 which co-operates with a valve seat 39 to form a restricted flow connection between the two passages 33 and 36. The amount of restriction is changed by rotating the valve element 37 to change the relative position of the valve seat 39 and the valving portion 38. The valve element 37 is preferably provided with calibrations so that the operator can rotate the valve element 37 to obtain any desired degree of flow restriction. The resistance to flow through the variable orifice 34 provides hydraulic damping which resists movement of the frame 11 relative to the flat car 10. The amount of energy absorbed is a function of the velocity of movement of the piston 23 and the setting of the orifice 34. If large loads are mounted on the frame 11, the valve member is rotated to increase the flow restriction, and for lighter loads, the valve element 37 is adjusted to provide less flow restriction.

A charging fitting 41 is mounted on the rearward end of the second cylinder 22 so that the rearward chamber 32 can be pressurized with the desired amount of air pressure and similarly, a charging fitting 42 in the end member 21 permits the charging of the device with oil. The rearward end of the first cylinder 19 is vented through an air filter 43 to prevent the entrapment of air to the left of the piston 23.

Figure 3:
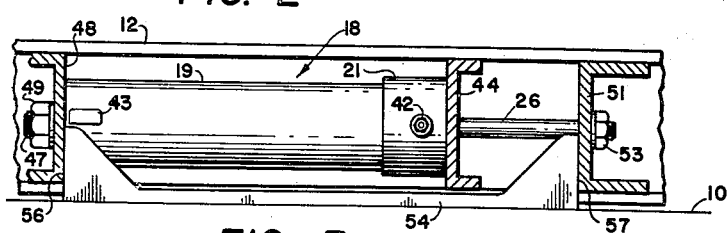
Figure 3 is a fragmentary view taken along 3—3 of Figure 2.

The end member 21 is mounted on a cross guide 44 by bolts 46. A threaded end on the piston rod 26 extends through a second cross member 51 and is provided with a shoulder 52 which co-operates with a nut 53 to rigidly connect the piston rod 26 to the cross member 51. A yoke 54, best illustrated in Figure 3, is mounted on the flat car 10 and provides opposed stops 56 and 57 adapted to engage the cross members 48 and 51 when the spring is in the fully compressed position.

Figure 5:
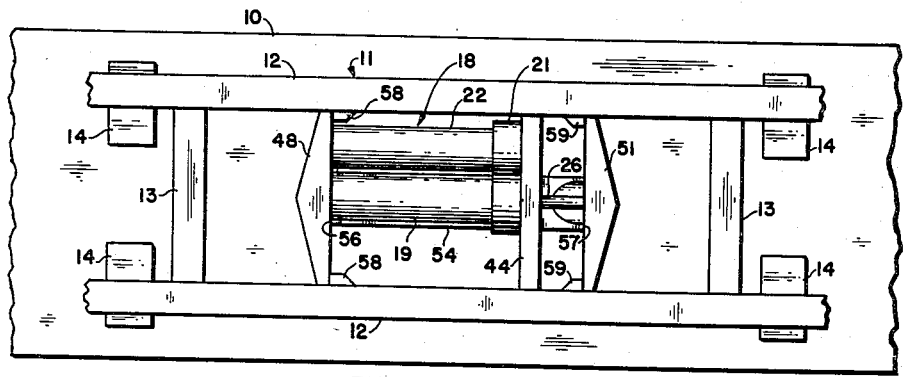
Figure 5 is a fragmentary plan view of the mechanism showing the elements in the neutral or midposition.
Figure 6:
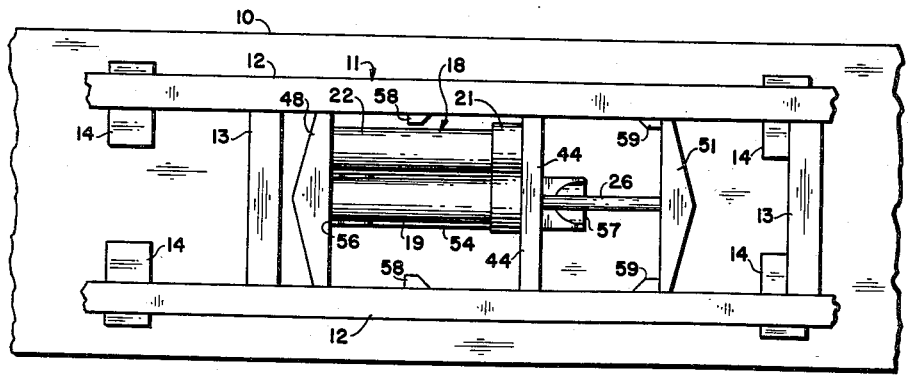
Figure 6 is a view similar to Figure 5 showing the positions the elements assume when the support frame moves to the right reltaive to the car.
Figure 7:
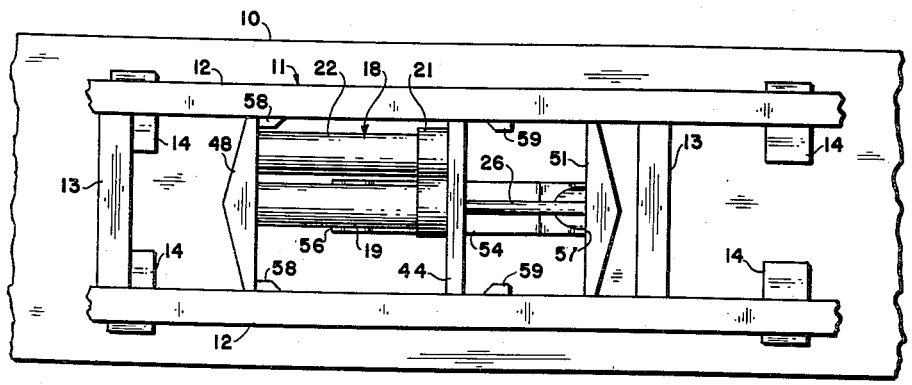
Figure 7 is a view similar to Figures 5 and 6 showing the positions the elements assume when the support frame shifts to the left relative to the car.

Referring now to Figures 5 through 7, the ends of the cross members 48 and 51 and the cross guide 44 extend into and are guided by the U-shaped channel provided by the side rails 12. A first pair of stops 58 mounted on the side rails 12 are adapted to engage the ends of the cross member 48. Similarly, a second pair of stops 59 mounted on the side rails 12 are adapted to engage the cross member 51. In the illustrated embodiment, the inner faces of the two cross members 48 and 51 are straight so the spacing between the stops 58 and 59 is equal to the spacing between the opposed stops 56 and 57 on the yoke 54. Therefore, when the frame 11 is in the midposition and the spring and shock absorbing assembly is fully compressed as shown in Figure 5, the cross member 48 engages the stops 56 and 58 and the cross member 51 engages the stops 57 and 59. If the frame 11 is moved to the right relative to the flat car 10, as illustrated in Figure 6, the cross member 51 is carried to the right by the stops 59. However, the engagement between the stops 56 on the yoke 54 and the cross member 48 prevents movement of the cylinders 19 and 22. Therefore, movement of the frame 11 to the right causes extension of the spring device and results in displacement of oil from the variable volume chamber 27 into the forward chamber 31. Both the pressure of the air within the rearward chamber 32 and the restricted flow through the adjustable orifice 34 resist this movement. When the frame 11 moves to the left relative to the flat car 10, the engagement between the stops 58 and the cross member 48 causes the cross member 48 and in turn the two cylinders 19 and 22 to move to the left with the frame 11. Engagement between the fixed stop 57 and the cross member 51, however, prevents movement of the piston rod 26 to the left with the frame 11; so again, the piston 23 moves to the right relative to the first cylinder 19 and displaces oil into the forward chamber 31. By providing this type of mounting for the spring and shock absorbing assembly 18, movement of the frame 11 in either direction from the neutral position of Figure 5 causes an extension of the piston rod 26. Therefore, a single spring device can be used to resist movement of the frame in either direction and a single orifice can be used to provide the shock absorbing function. Movement of the frame 11 only occurs when the flat car 10 is accelerated or decelerated. Therefore, the action of the spring returns the frame 11 to the neutral position after the acceleration or deceleration takes place. The load is therefore permitted to shift relative to the flat car 10 to prevent excessive acceleration forces from being applied to the load but it is automatically returned to the neutral position as soon as the acceleration of the flat car ceases. The proper adjustment of the valve element 37 provides the proper damping for any given load and insures that the load will not be subjected to damaged accelerating forces.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

We claim:

1. A load shock absorbing mechanism for vehicles comprising a frame on said vehicle movable relative thereto, first spaced opposed fixed stops mounted on said vehicle, second spaced opposed stops on said frame, a first member engageable with one of said first stops and one of said second stops, a second member engageable with the other of said first stops and the other of said second stops, and spring and damping means connected to said members resisting movement of one of said members relative to the other of said members in one direction, said members engaging both of their associated stops when said frame is in a midposition relative to said vehicle, said stops moving said one member relative to said other member in said one direction against the action of said spring and damping means in response to movement of said frame in either direction from said midposition.

2. A load shock absorbing mechanism for vehicles comprising a frame on said vehicle movable relative thereto, first spaced opposed fixed stops mounted on said vehicle, second opposed stops in said frame spaced apart a distance equal to the spacing between said fixed stops, a first member engageable with one of said first stops and one of said second stops, a second member engageable with the other of said first stops and the other of said second stops, and a fluid spring damper connected to said members resisting movement of one of said members relative to the other of said members in one direction, movement of said frame in either direction of said midposition moving said one member relative to said other member in said one direction against the action of said spring damper.

3. A load shock absorbing mechanism for vehicles comprising a frame on said vehicle movable relative thereto, first spaced opposed fixed stops mounted on said vehicle, second spaced opposed stops on said frame, a first member engageable with one of said first stops and one of said second stops, a second member engageable with the other of said first stops and the other of said second stops, and spring and damping means connected to said members urging them toward each other, said members engaging both of their associated stops when said frame is in a midposition relative to said vehicle, said stops moving said members apart against the action of said spring and damping means in response to movement of said frame in either direction from said midposition.

4. A load shock absorbing mechanism for vehicles comprising a frame on said vehicle movable relative thereto, first spaced opposed fixed stops mounted on said vehicle, second spaced opposed stops on said frame, a first member engageable with one of said first stops and one of said second stops, a second member engageable with the other of said first stops and the other of said second stops, and an air spring and liquid damping assembly providing two elements wherein relative movement in one direction is resiliently resisted, a first connection between one element and said first member, a second connection between the other of said elements and said second member, said members engaging both of their associated stops when said frame is in a midposition relative to said vehicle, movement of said frame in either direction from said midposition moving said elements in said one direction.

5. A load shock absorbing mechanism for vehicles comprising a frame on said vehicle movable relative thereto, first spaced opposed fixed stops mounted on said vehicle, second spaced opposed stops on said frame, a first member engageable with one of said first stops and one of said second stops, a second member engageable with the other of said first stops and the other of said second stops, a cylinder connected on said first member, a piston in said cylinder connected to said second member, fluid under pressure in said cylinder resiliently urging said piston in one direction relative to said cylinder, said members engaging both of their associated stops when said frame is in a midposition relative to said vehicle, movement of said frame in either direction from said midposition moving said piston relative to said cylinder in a direction opposite said one direction.

6. A load shock absorbing mechanism for vehicles comprising an elongated frame adapted to be rigidly connected to a load mounted on said vehicle for axial movement relative to said vehicle in either direction from a midposition, a fluid spring damper including two cylinders and a piston slidable in each cylinder, a restricted flow connection between one of said cylinders on one side of its associated piston and the other of said cylinders on one side of its associated piston, liquid filling said cylinders on said one side of their associated pistons, compressed gas in said one cylinder on the other side of its associated piston, and means connecting said frame, vehicle, and spring damper producing relative movement between said other cylinder and its associated piston in a direction toward the liquid in said other cylinder in response to movement of said frame in either direction from said midposition.

7. A load shock absorbing mechanism for vehicles comprising a frame having parallel side rails mounted on said vehicle for axial movement relative thereto in opposite directions from a midposition, a fluid spring damper between said side rails including two cylinders and a piston slidable in each cylinder, a flow connection between one of said cylinders on one side of its associated piston and the other of said said cylinders on one side of its associated piston, an adjustable flow restriction in said flow connection, liquid filling said cylinders on said one side of their associated pistons, compressed gas in said one cylinder on the other side of its associated piston, and a connection between said frame, vehicle, and spring damper producing relative movement between said other cylinder and its associated piston in a direction toward the liquid in said other cylinder in response to movement of said frame in either direction from said midposition.

References Cited in the file of this patent
UNITED STATES PATENTS

| | | |
|---|---|---|
| 68,001 | Potter | Aug. 20, 1867 |
| 114,268 | Cottrell | May 2, 1871 |
| 1,237,088 | Pervelis | Aug. 14, 1917 |
| 2,047,955 | Fitch | July 21, 1936 |
| 2,810,535 | Albright | Oct. 22, 1957 |

Notice of Adverse Decision in Interference

In Interference No. 92,847 involving Patent No. 2,973,174, T. Stanwick, W. Hamilton and J. E. Hannigan, VEHICLE LOAD SHOCK ABSORBING UNIT, final judgment adverse to the patentees was rendered Nov. 19, 1965, as to claims 1, 2 and 5.

[*Official Gazette May 17, 1966.*]